US005626296A

United States Patent [19]
Monson et al.

[11] Patent Number: 5,626,296
[45] Date of Patent: May 6, 1997

[54] QUICK REACTING AIR SPREADER APPARATUS

[76] Inventors: Robert J. Monson, 1027 Brenner Ave., St. Paul, Minn. 55113; Laura K. Ehleringer, P.O. Box 54, Lowry, Minn. 56349

[21] Appl. No.: 364,673

QUICK REACTING AIR SPREADER APPARATUS

BACKGROUND OF THE INVENTION

1. Field of the Invention

This present invention relates generally to an improved vertical auger utilized in pneumatic spreader systems for distribution of granular agricultural crop and soil treating chemicals, and more particularly to an improved system for achieving uniform distribution of such products through the use of an improved self regulating vertical auger which effectively reduces the inherent delay in product metering.

2. Description of the Prior Art

The present invention finds particular utility for use in combination with those certain agricultural spreader systems such as disclosed in U.S. Pat. No. 5,092,526, issued Mar. 3, 1992, to Takata, and entitled *Venturi System For Agricultural Spreaders Of Solid Particles;* U.S. Pat. No. 5,018,668, issued May 28, 1991, to Bauer, and entitled *Method And Apparatus For Initiating Rotation Of Vertical Auger Devices;* and U.S. Pat. No. 4,964,575, issued Oct. 23, 1990, to Takata, and entitled *Boom Flow Control Mechanism For Pneumatic Spreaders,* the aforementioned patents being assigned to the same assignee as the present invention, and hereby incorporated by reference in their entirety. The apparatus of the present invention allows an agricultural spreader system conveyor and vertical auger to shut down when no product is being metered from the metering device without exhibiting any substantial 'puff' of product when the system is restarted, and while simultaneously enhancing the accuracy of the air spread in the particular spreader system.

Pressurized pneumatic systems utilizing a single distribution head delivering or metering a supply of granular or particulate material for controlled discharge of such material from a plurality of elongated booms have been employed in the past. However, the systems currently in use normally deliver granular products through use of a vertical auger which is designed to rotate under conditions of substantially constant speed and constant torque. Occasionally, and particularly when the system has been shut down for an interval of time with material remaining in the vertical auger, some uneven flow may occur at the time of vertical auger start-up. The non-uniformity may result from the packing of particulate material within the auger during the interval of shutdown, and upon start-up, the rotation of the vertical auger may occur in a non-uniform fashion. The present invention provides a reliable system for maintaining the distribution and application rate at a substantially uniform and constant level through the active booms.

Agricultural techniques require the utilization of soil treating agents and crop treating agents to either encourage, discourage, destroy or inhibit plant growth. Such agents may generally be characterized as crop treating chemicals, and include materials designated as nutrients such as fertilizers, and pesticides such as insecticides and herbicides including pre-emergent and/or post-emergent growth inhibitors. Accordingly, the term "crop treating chemical" is used in a comprehensive sense to incorporate those various ingredients utilized in agriculture to treat either the soil, the growing crop or plants, or certain insects which may damage the crop. Active materials used for treatment are commonly found in one of three forms, including water soluble, water wettable, particulate solid or in surface-impregnated solid form. In connection with the present invention, granular materials and/or surface-impregnated (wetted) granular materials are of particular interest, with the system of the present invention being particularly adapted for use in connection with the selective and uniform distribution of such materials through the system and onto the soil or other surfaces being treated.

In the treatment of agricultural fields and crops through spreading of one or more active treating ingredients, the efficiency of the treatment operation may be enhanced if the distribution of the ingredients is maintained at a uniform and/or controllable rate, particularly at the point of ingredient metering. Uniform application rates continue to be an important factor, particularly with the use of certain pesticides and/or herbicides which require a predetermined application rate in order to be effective, and not otherwise harmful to the crop being treated. Occurrences of under-application or over-application of crop treating materials may result in application being either ineffective or, in certain instances, harmful to the crop. Additionally, the efficiency of the operation may be enhanced if the actual load required to be carried by the spreading equipment is reduced. Therefore, the utilization of dry particulate solids will substantially reduce the load requirement, inasmuch as water or other treatment medium or treatment vehicle is not required. The need for multiple passes may be reduced if surface-impregnated granular material may be uniformly spread, such as through the use of a granular fertilizer having a surface impregnated with a particular pesticide. The utilization of pressurized pneumatic systems will normally eliminate or substantially reduce the vehicle load by eliminating the need for large quantities of water, since pneumatic systems normally utilize a compressor to generate a supply of compressed air in lieu of a liquid plus liquid pressure source as a means to create a medium for accomplishing delivery of the treating ingredient onto the soil.

Pneumatic spreader systems typically are mounted upon self-propelled vehicles, thereby providing a means for achieving the distribution. In order to render these systems efficient, elongated booms are employed, and it is not uncommon for such booms to extend outwardly a distance of 20 feet or more from the center axis of the vehicle. When the operator reaches the end of a field, the entire capability of the system is shut down for turn-around to avoid any excessive or double-coverage. In order to render the system more highly advantageous, this interruption of flow is achieved while maintaining substantially uniform application rates upon start-up. An added advantage of the system permits intermittent shut-down of certain booms when the fertility index varies across the field being treated, with uniform distribution being achieved upon the occurrence of start-up.

During normal operation, the vertical auger becomes loaded with granular material. In those instances when the machine reaches the end of the field, and is being turned around for initiation of the next application run, the material remaining in the augers presently in use tends to flow downwardly along the ramp formed by the auger flutes, thereby becoming more densely packed within the confines of the auger. Occasionally, on these occurrences, the auger resists initial start-up until the packed material breaks away, and auger rotation is commenced. Initiation of auger rotation accordingly requires higher-than normal torque, and preferably lower-than normal running rates until complete break-away occurs for augers presently in use in pneumatic spreader systems. In most instances, the interval of time required for break-away is equivalent to somewhere between 180 degrees of auger rotation, or somewhat greater period.

As indicated hereinbefore, uniformity of distribution of particulate materials depends to a certain extent upon operation of the entire system, including the distribution head and the material transferring conduits, as well as the vertical auger. In order to preserve operational integrity and predictability, therefore, uniformity of rate of rotation of the vertical auger is a desirable feature.

Furthermore, from the moment product is metered from the control point (e.g. the meter wheels) until it arrives on the ground or other area of interest, the total delay is approximately 2 seconds for pneumatic air spreader systems presently in use. At 20 mph this correlates to approximately 60 feet traversed, and a spread area of 3600 ft$^2$ or approximately 8.3% of an acre. In the case of highly dynamic vehicular steering, the system has no other means of improving accuracy than to speed up the reaction time, or reduce system delay.

Pneumatic air spreader systems presently in use allow the conveyor and vertical auger to shut down when no product is being metered from the metering wheels. This allows some product to travel back down the flighting of the vertical auger in static mode, resulting in what has been described as a 'puff' of product when the system is restarted. Some systems presently in use have given consideration to keeping the vertical auger running during turns or have delivered higher torque rates to the vertical auger when the system is restarted. Such attempts to achieve accurate spreading have created the largest system delays during product application or else have continued to generate some 'puff' of product when the system is restarted.

The present invention addresses the aforementioned problems in a manner to both increase the accuracy (reduce the 'puff') and decrease the system delay. The features of the present invention have been found desirable for improving the performance of systems when the operation of the vertical auger has been temporarily interrupted.

This increased accuracy and decreased system delay are achieved through the utilization of a self-regulating vertical auger which traps the product to be delivered, more or less in position in the auger stream when the vertical auger is stopped.

SUMMARY OF THE INVENTION

The present invention, directed to an improved vertical auger for use in a pneumatic air spreader system, effectively reduces or minimizes 'puff' of product when the air spreader system is restarted following shut down. The improved air spreader system which results, also effectively reduces or minimizes the delay time which transpires between the moment when the product is metered and the moment when the metered product is delivered onto the surface to be treated.

Briefly, and in accordance with the present invention, an improved solid granular product applicator system is provided which improves the performance of the vertical auger by providing a means for trapping the product to be delivered, more or less in position in the auger stream when the vertical auger is stopped.

A particular advantageous feature of the present invention is its ability to effectively reduce or eliminate 'puff' of product when the system is restarted following shut down.

Another advantageous feature of the present invention is its ability to effectively minimize or reduce system delay time which transpires between the moment when the product is metered and the moment when the metered product is delivered onto the surface to be treated, thereby increasing the accuracy of system performance.

Yet another advantage of the present invention is its ability to effectively handle and utilize impregnated or surface treated granular materials such as pesticide/herbicide impregnated fertilizers while maintaining desired and uniform application patterns without creating unusual material build-up or clogging of individual booms, or pulsation of output.

It is particularly noteworthy that the present invention could also be utilized in the application of seeds in addition to the aforementioned agricultural products.

The improved system is normally and preferably mounted upon a vehicle chassis such as the chassis of a self-propelled vehicle including either a tractor or a trailer. The system typically includes a reservoir with the source of supply of agricultural crop or soil treating products (e.g. chemicals, seeds, etc.) wherein the chemicals may be in granular or particulate solid form to be distributed, such as, for example, a nutrient such as a fertilizer and/or a pesticide such as an insecticide or herbicide, along with the vertical auger for delivering the products into the distribution head, and thence into the spreader and distribution mechanism.

Applicator systems having the features and advantages of the present invention are typically provided with a number of conventional components, including, but not necessarily limited to:

(a) a reservoir or hopper for retaining a supply of particulate solids;

(b) a means of conveying the granular particulate solids to a vertical auger which delivers the products to a distribution head where the supply is metered by being divided into a number of aliquot portions, with this conveying means being driven with a variable speed motor so as to control the quantity of granular particulate material (e.g. fertilizers, insecticides, herbicides, seeds, etc.) delivered to the distribution heads;

(c) a means for delivering the metered aliquot portions to the elongated booms; and (d) a means, such as a blower or compressor for delivering a supply of compressed air, to move the material along with a flow of air outwardly through the booms and ultimately to a point of discharge.

These systems may optionally be provided with:

(e) a means for impregnating individual granular particles with an additional crop or soil-treating ingredient, such as an aqueous coating of a pesticide or other material.

Turning now to the vertical auger and distribution head components briefly and individually, a vertical auger is provided which carries the granular or particulate material upwardly from a horizontal conveyor upwardly to the inlet of the distribution head. As indicated hereinbefore, whenever motion in the vertical auger is interrupted, residual material in the augers presently in use may tend to become compacted and otherwise bind against the cylindrical walls of the auger, and render it necessary to initially "breakaway" the material from the auger walls. The system of the present invention achieves this result while preserving uniformity of flow of particulate material through the system.

As stated hereinbefore, the present invention is directed to a quick reacting air spreader system having an improved vertical auger for effectively reducing or minimizing 'puff' of product when the air spreader is restarted following shut down. The inventive air spreader system also effectively reduces or minimizes the delay time which transpires between the moment when the product is metered and the moment when the metered product is delivered onto the surface to be treated.

The hereinbefore stated advantages are achieved by providing a means for trapping the product to be delivered, more or less in position in the auger stream when the vertical auger is stopped. The trapping means creates a fully loaded vertical auger in the static position, by preventing settling of the product in static mode through the use of a simple baffle system within the housing of the vertical auger which effectively traps the product into a series of separate chambers within the auger housing. The number of baffles is dependent only upon the desired uniformity of loading required on the auger.

As stated hereinbefore, it is particularly noteworthy that the present invention could also be utilized for the application of seeds as well as other aforementioned agricultural products, including, but not necessarily limited to fertilizers, insecticides, herbicides and various other nutrients and pesticides.

BRIEF DESCRIPTION OF THE DRAWINGS

Other features of the present invention and many of the attendant advantages of the present invention will be readily appreciated as the same becomes better understood by reference to the detailed description when considered in connection with the accompanying drawings in which like reference numerals designate like parts throughout the figures thereof and wherein.

Figure 1:
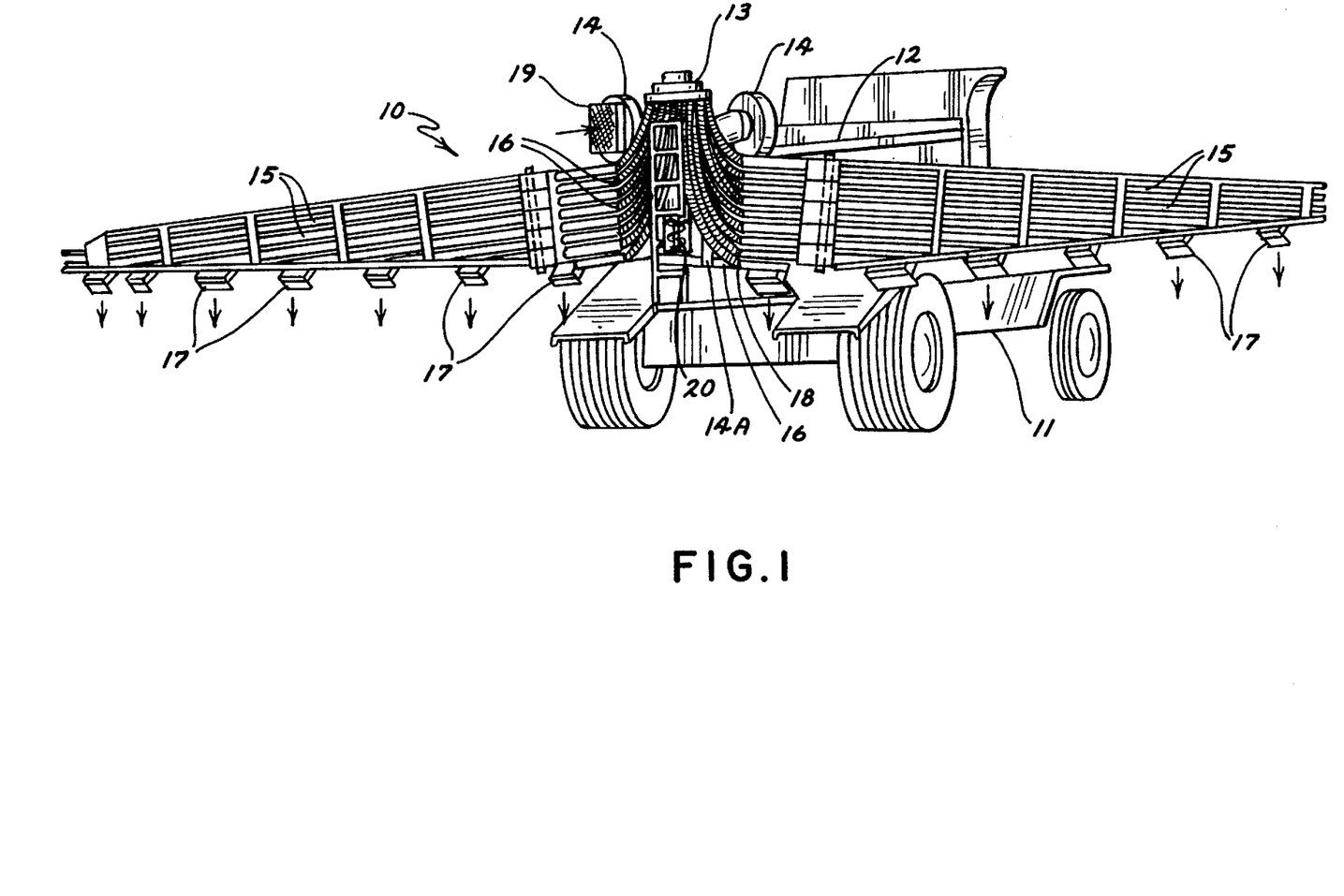
FIG. 1 is a perspective view of the side and rear portions of a typical vehicle chassis supporting a vehicular-mounted system incorporating a distribution head, a compressor, and a plurality of el preventing settling of the product in static mode. Generally, vertical augers such as auger 20 illustrated in FIG. 2, move product 26 by taking advantage of the product's 26 inertial properties. As the auger 20 spins, the product 26 slips across the bearing surface of the flighting 24, partially due to the low surface friction and partially due to the particulate action of the product 26. Thus, the product 26 does not spin through the auger 20, but instead, travels more or less straight up the auger 20 while flowing across the bearing surface of the flighting 24.
Figure 2:
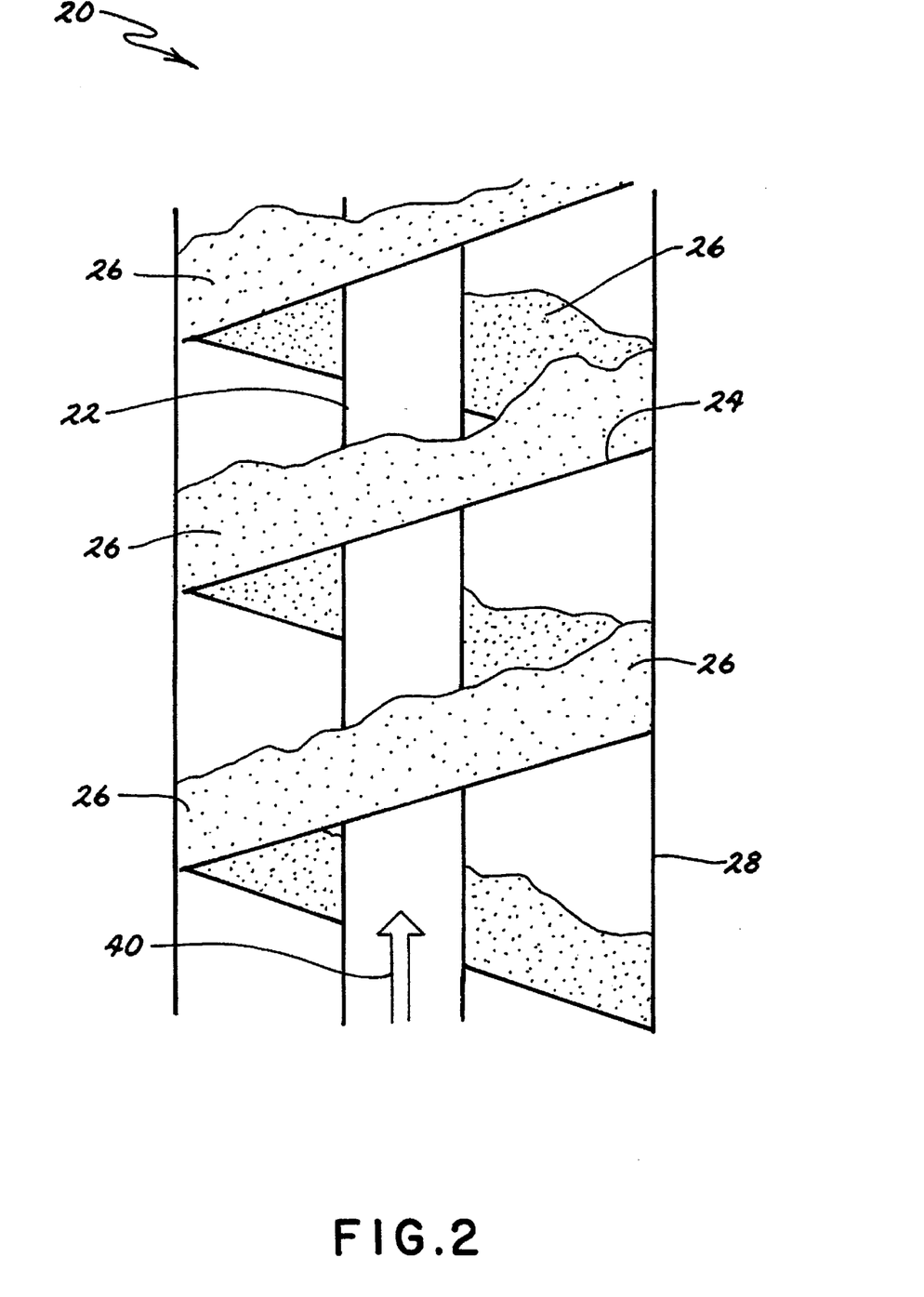
Figure 3:
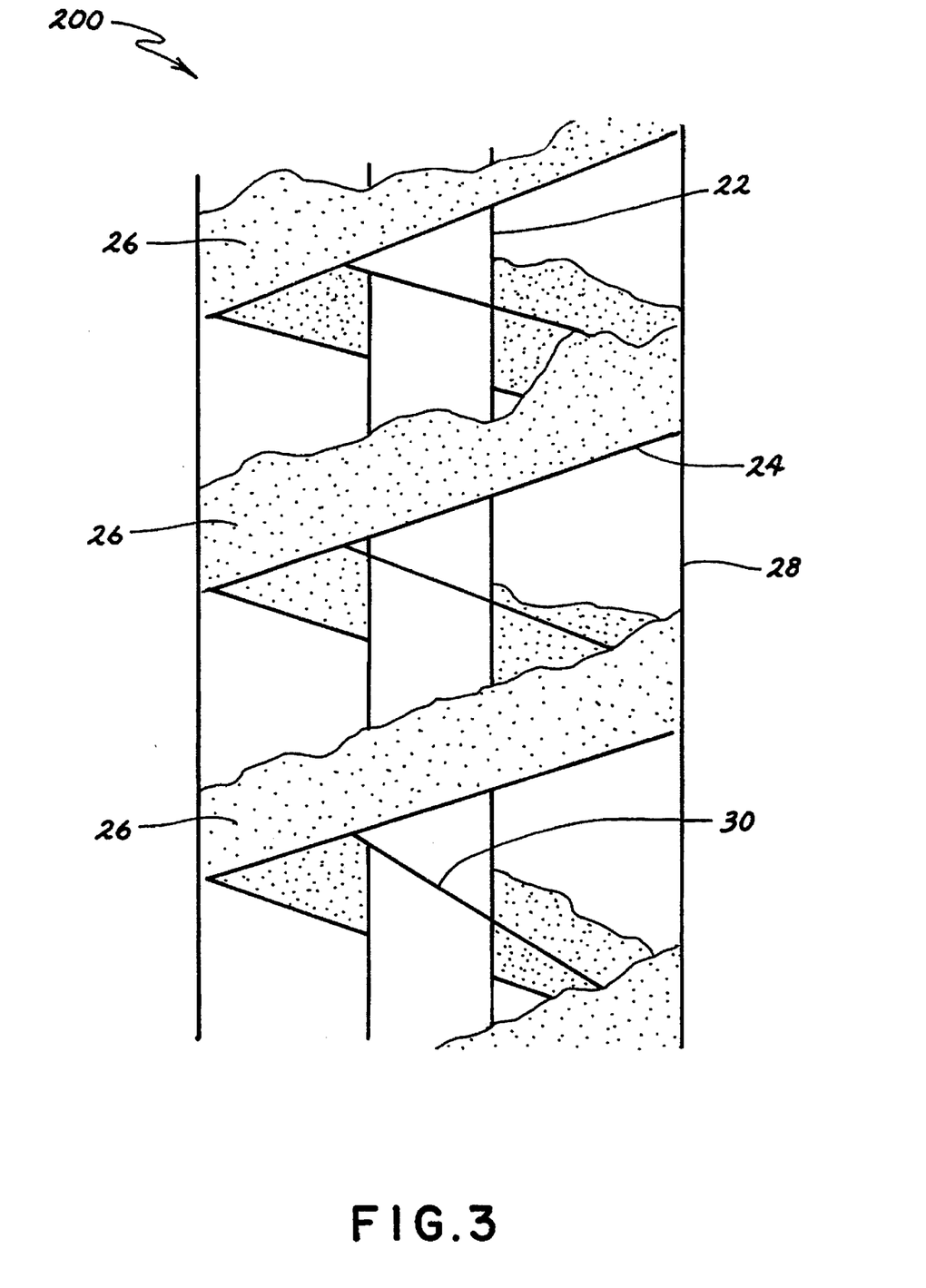
Figure 4:
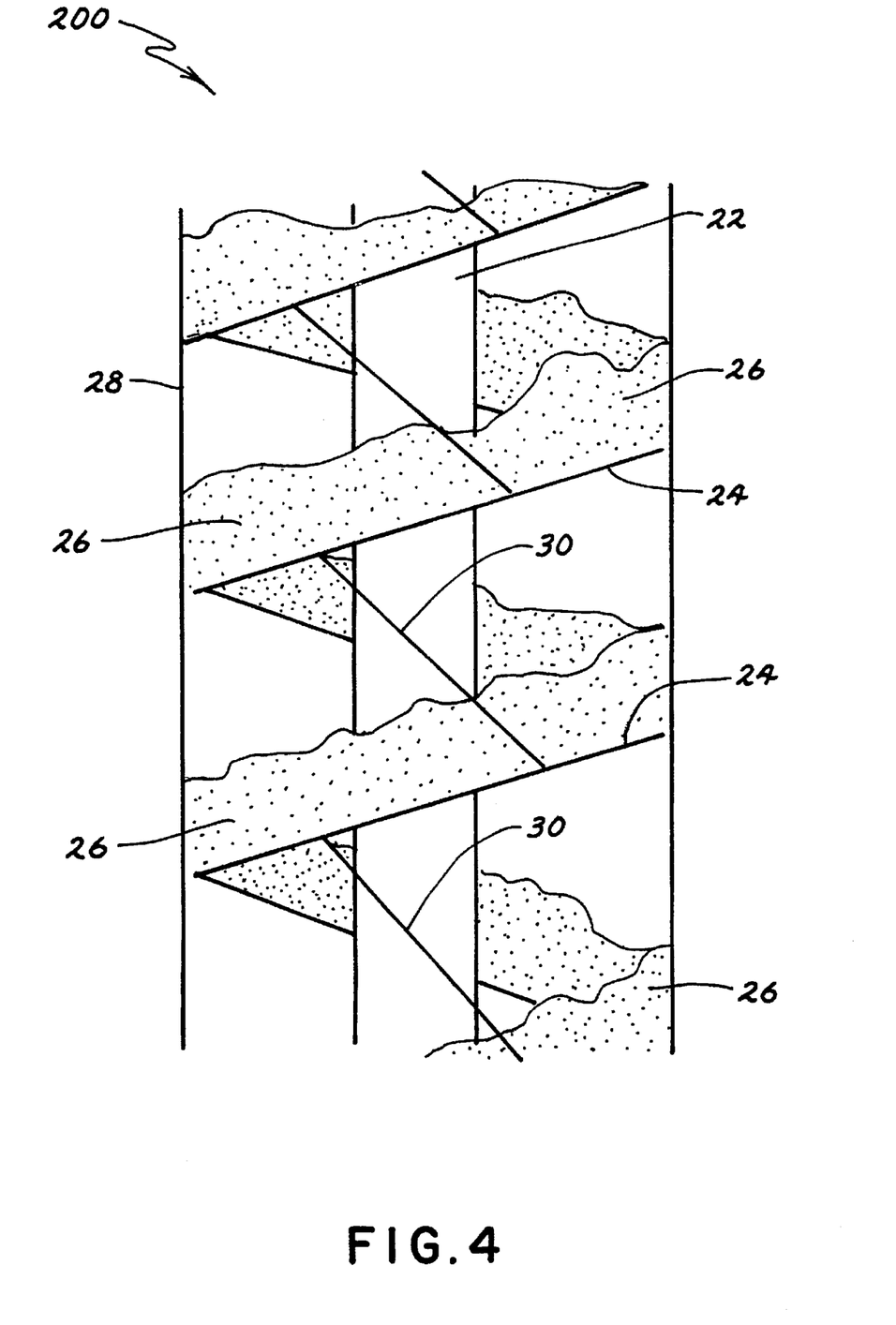
Figure 5:
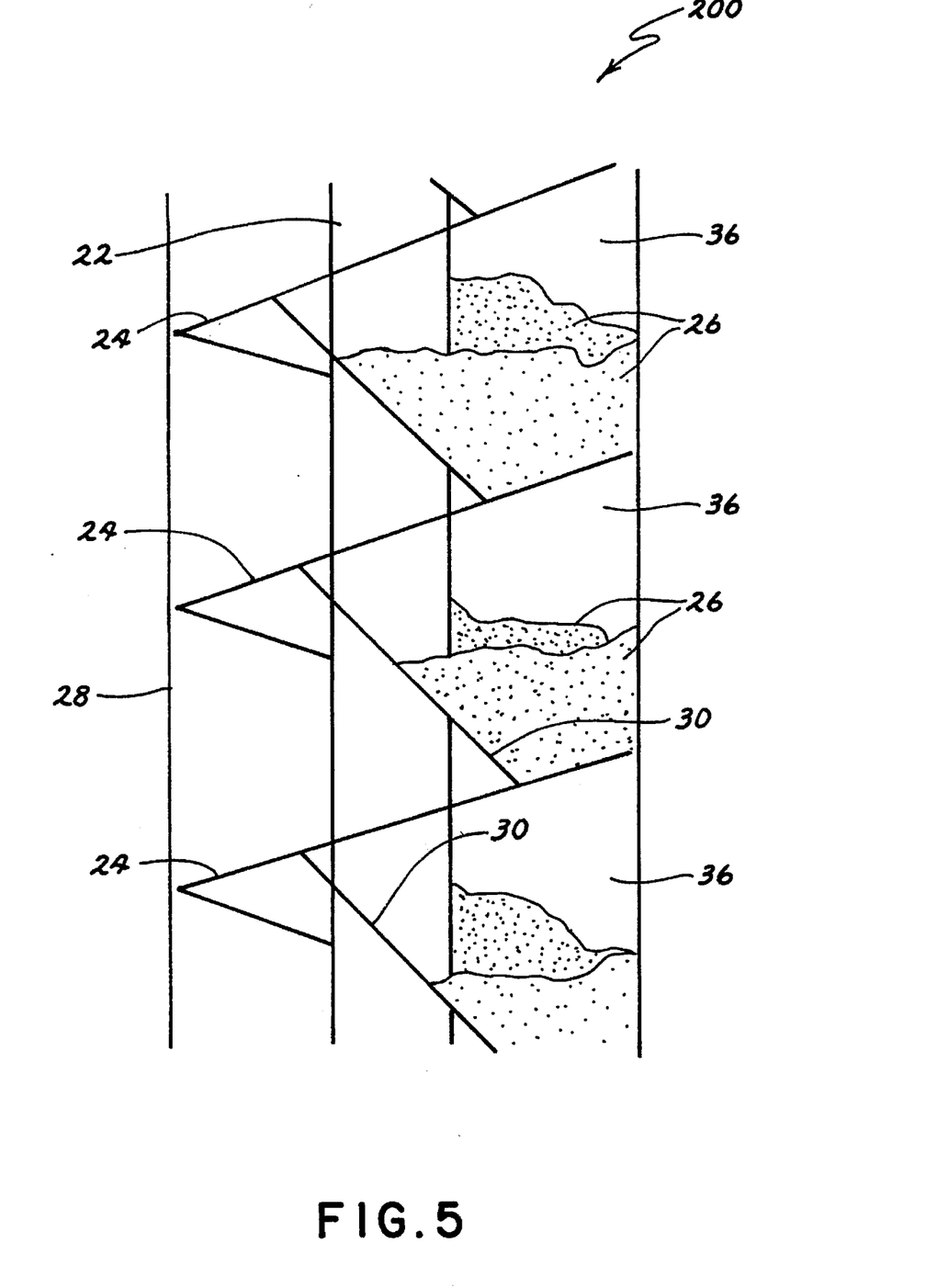
Figure 6:
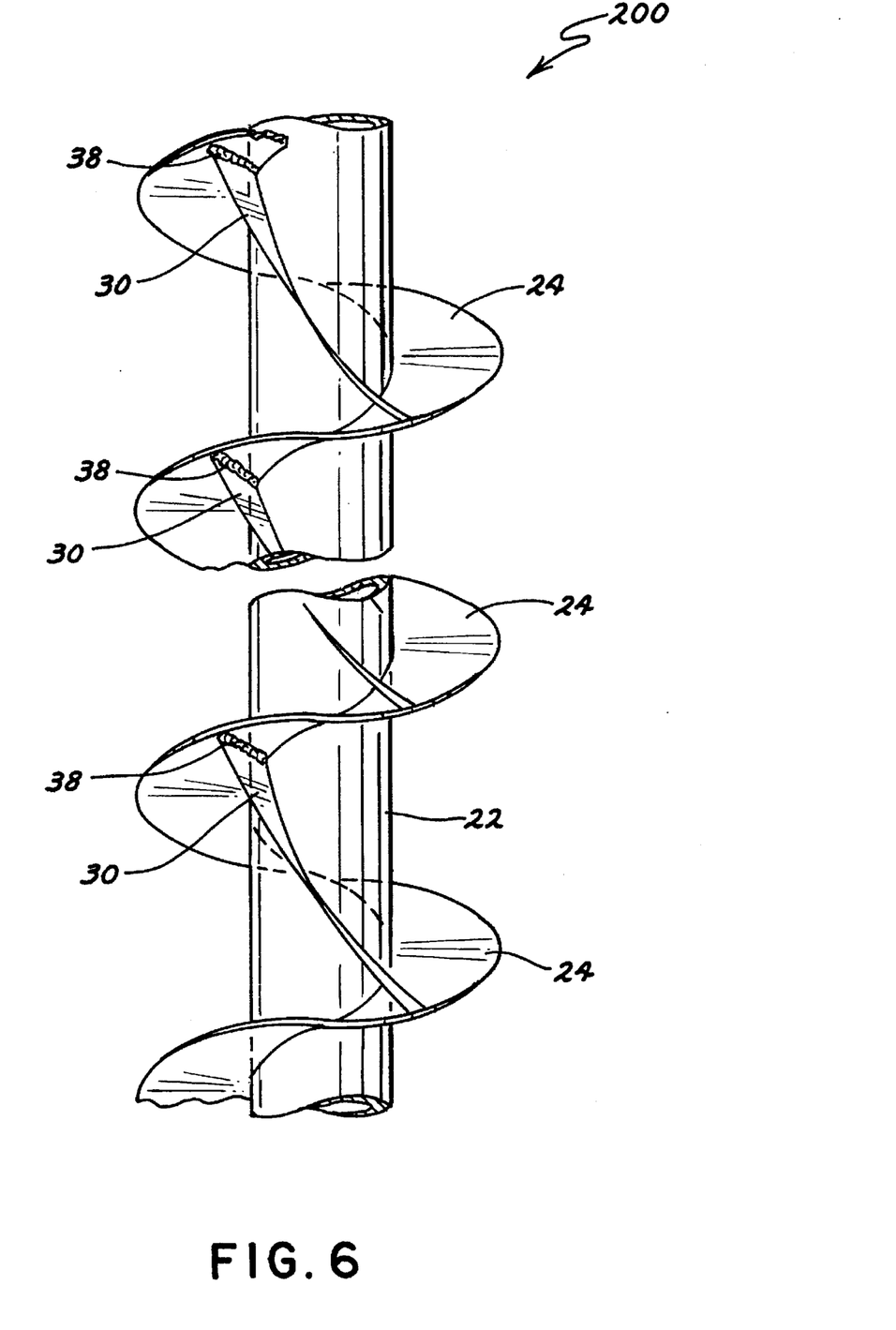

FIG. 3 illustrates a simplified pictorial side view of a self-regulating vertical auger 200 in accordance with one preferred embodiment for the present invention. The present inventive auger 200 is different from auger 20, which is old and known to those in the art, in that auger 200 preferably also utilizes at least one, and more preferably, a plurality of baffle means 30.

As stated hereinbefore, there have been considerable problems related with shutting down the vertical auger 20 on air spread systems when in application mode. This shutdown allows product shifting inside auger 20 and ultimately results in misapplication delivered product for a short period of time immediately following restart-up of auger 20.

Recent efforts by those skilled in the art have focused on the capability of the controls (not shown), building in flexibility and reaction speed of the spreader system. Such efforts have proven very successful, and therefore point out the present bottleneck in further speed enhancements, the inherent delay in product metering.

From the moment product is metered from the control point, the metering wheels, until it arrives on the surface area of interest, a total delay of approximately two seconds occurs on the average. At twenty mph, this correlates to approximately sixty feet traversed, and a spread area of approximately 3600 square feet or approximately 8.3% of an acre, as stated hereinbefore. Quite obviously, this area can be spread utilizing prediction routines within available system software to enable spreading to land at the right location. Such techniques work well where there is not a great deal of turning occurring in the path of spreading. In the case of highly dynamic steering however, the spreader system 10 has no other means of improving accuracy than to speed up the reaction time, or reduce system delay.

Present multibin systems allow the conveyor (not shown) and vertical auger 20 to shut down when no product is being metered from the metering wheels (also not shown). This technique allows some product to travel back down the flighting 24 of the vertical auger 20 in static mode, resulting in what has been described as a 'puff' of product when the system 10 is restarted, as described hereinbefore. Consideration has been given to keeping the vertical auger 20 running during turns, but this also results in a larger delay before the start-up of product through the booms 15—15 when the turn is completed. Continuously running the vertical auger 20 and the conveyor (not shown) result in the most accurate spreading, as all metered product is unloaded from the system 10, but also creates the longest system 10 delay when applying. None of the hereinbefore mentioned solutions addresses the problem in a manner to both increase the accuracy (reduce the 'puff') and decrease the system 10 delay.

FIGS. 3–6 illustrate a self regulating vertical auger 200 in accordance with one preferred embodiment for the present invention which successfully addresses the aforementioned issues. Due to the ease of flow required to move product 26 up the augers 20 presently in use, it naturally is capable of settling back down the auger 20 in a very short period of time. This results in a rotation of product 26 through the auger 20 when it is standing still, packing product 26 in the bottom portion of the auger cylinder 28. Due to the fact that there is a great deal of agitation of product 26 when it passes back down the auger 20 path in a reverse direction to that indicated by arrow 40, the final product 26 packs more tightly than when the product is traveling up the auger 20 in the direction of arrow 40. Thus, the product 26 all settles to the bottom of auger 20 and packs very tightly together. This packing results in excessively high starting torques required of the auger 20 motor (not shown). Should the product not be allowed to travel a great distance down the auger 20, the torque required should not differ significantly from the loaded starting torque expected of the auger 20.

One method of creating a regulated, or loaded, auger is to trap the product 26 more or less in position in the auger 20 stream. FIGS. 3–6 illustrate the present inventive technique and apparatus which successfully address the aforementioned problems associated with augers generally, and agricultural air spreader systems specifically.

Looking again at FIG. 3, auger 200 is shown having a plurality of baffles 30 used to trap the product 26 into a series of separate chambers within the auger 200 cylinder 28. The number of baffles 30 employed within auger 200 cylinder 28 is dependent upon how uniform a loading is desired or required on the auger 200. In FIG. 3, the product 26 is moving in an upward vertical direction. Hence, baffles 30 are shown in the open position, a position resulting from force applied against the baffles 30 by the movement of product 26. Baffles 30 are oriented such that the baffles 30 hinge freely out of the way of the product 26 only when the product 26 in moving in an upward vertical direction. During the upward vertical movement of the product 26, the baffles 30 hinge freely out of the way such that the baffles 30 ride on the top surface of the moving product 26. The baffles 30 would then only return to the fully closed position when the auger 200 has stopped, and the product 26 movement started in the reverse downward vertical direction such as depicted in FIG. 4.

FIG. 4 illustrates inventive auger 200 when auger 200 has stopped, and shortly after the product 26 has started movement in the reverse downward vertical direction. It can be seen that the force produced by product 26 against the baffles 30 in the reverse direction forces baffles 30 to return to the closed position.

Looking now at FIG. 5, inventive auger 200 is shown when auger 200 has stopped, and after the product 26 has stopped movement in the reverse downward vertical direction and after the product 26 has completed its settling and compaction process. Here, baffles 30 are shown trapping the product 26 into a series of separate chambers 36 within the auger 200 cylinder 28.

Thus, a simple hinge arrangement can be used, which merely holds the freely moving baffles 30 in position, such as illustrated in FIG. 6. FIG. 6 illustrates a partial perspective view of auger 200 in accordance with one preferred embodiment for the present invention. The baffles 30 are preferably coupled to the bottom surface of flighting 24 at predetermined positions dependent only on the desired or required loading on auger 200 as stated hereinbefore. Preferably, each baffle 30 is coupled to the flighting 24 with a continuous hinge 38, although another type of hinge arrangement could also be used. Each baffle 30 is shaped to conform to the inside surface of auger 200 cylinder 28 and also to the top surface of flighting 24 such that the flow of product 26 in the reverse downward vertical direction is completely stopped. In one preferred embodiment, baffle 30 is shaped generally like a 90° portion of a doughnut when viewed from the top or bottom.

Any number of other configurations could be used to form the baffles 30, such as a horizontally moving baffle, which would also close when the reverse flowing product pushed against the baffle 30 surface. Regardless of shape, each baffle 30 would perform the same basic function, that of keeping the vertical auger 200 fully loaded in a static position.

The use of the simple inventive baffle system within the cylinder 28 of the vertical auger 200 greatly enhances the accuracy of the product air spread and in particular the multibin system 10. This simple and inexpensive inventive auger 200 finally settles the longstanding question of whether the vertical auger 20 should run all the time (continuously), or whether it should be stopped. Most importantly, it reduces the lag time associated with start-up of the system 10, and removes the 'puff' component from the beginning of each pass. This results in a far better application system 10 for the customer, and overall is the most direct and effective solution for the aforementioned concerns.

This invention has been described herein in considerable detail in order to comply with the Patent Statutes and to provide those skilled in the art with the information needed to apply the novel principles and to construct and use such specialized components as are required. However, while a particular embodiment of the present invention has been described herein in detail, it is to be understood that various alternations, modifications and substitutions can be made therein without departing from the spirit and scope of the present invention, as defined in the claims which follow.

I claim:

1. In a system for distributing particulate solids, said system including a reservoir containing said particulate solids to be distributed and a vertical auger for conveying said particulate solids from said reservoir, said vertical auger having a housing and a generally continuous auger flighting rotatably mounted within said housing such that rotation of said generally continuous auger flighting transports said particulate solids in an upstream direction, the improvement comprising:

at least one baffle pivotally connected to the generally continuous auger flighting at a predetermined position and orientation such that said at least one baffle moves between a closed position obstructing the passage of the particulate solids through the housing of the vertical auger and an open position, wherein pressure exerted by the movement of the particulate solids through the housing of the vertical auger in the upstream direction pivots said at least one baffle to said open position permitting passage of the particulate solids past said at least one baffle, and movement of the particulate solids through the housing of the vertical auger in a downstream direction exerts pressure against said at least one baffle to pivot said at least one baffle to said closed position, thereby blocking further downstream movement of the particulate solids disposed upstream of said at least one baffle.

2. The system of claim 1 wherein the generally continuous auger flighting has a top surface and a bottom surface, and wherein the at least one baffle is pivotally connected to said bottom surface of the generally continuous auger flighting.

3. The system of claim 1 wherein the vertical auger includes an auger shaft, and the at least one baffle is pivotally connected directly to the generally continuous auger flighting.

4. The system of claim 3 wherein the pivotal connection between the at least one baffle and the generally continuous auger flighting is a generally continuous hinge.

5. A vertical auger assembly for transporting material, said vertical auger assembly comprising:

a housing;

a generally continuous auger flighting rotatably mounted within said housing; and at least one baffle disposed within said housing and pivotally connected to the vertical auger assembly at a predetermined location and orientation relative to said generally continuous auger flighting such that said at least one baffle moves between a closed position obstructing the passage of the particulate solids through the housing of the vertical auger and an open position, wherein pressure exerted by the movement of the particulate solids through the housing of the vertical auger in an upstream direction pivots said at least one baffle to said open position permitting passage of the particulate solids past said at least one baffle, and movement of the material through said housing of the vertical auger in a downstream direction exerts pressure against said at least one baffle to pivot said at least one baffle to said closed position, thereby blocking further downstream movement of the material disposed upstream of said at least one baffle.

6. The vertical auger assembly of claim 5 wherein the generally continuous auger flighting has a top surface and a bottom surface, and wherein the at least one baffle is pivotally connected to said bottom surface of the generally continuous auger flighting.

7. The vertical auger assembly of claim 5 wherein the vertical auger includes an auger shaft and the at least one baffle is pivotally connected directly to the generally continuous auger flighting.

8. The vertical auger assembly of claim 7 wherein the pivotal connection between the at least one baffle and the generally continuous auger flighting is a generally continuous hinge.

* * * * *